United States Patent
Miyazaki et al.

(10) Patent No.: US 11,627,293 B2
(45) Date of Patent: Apr. 11, 2023

(54) METHOD OF CONTROLLING PROJECTOR AND PROJECTOR

(71) Applicant: SEIKO EPSON CORPORATION, Tokyo (JP)

(72) Inventors: Kei Miyazaki, Matsumoto (JP); Takao Hirakura, Matsumoto (JP); Takeshi Furihata, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/331,044

(22) Filed: May 26, 2021

(65) Prior Publication Data
US 2021/0377499 A1 Dec. 2, 2021

(30) Foreign Application Priority Data
May 26, 2020 (JP) .............................. JP2020-091444

(51) Int. Cl.
*H04N 9/31* (2006.01)

(52) U.S. Cl.
CPC ......... *H04N 9/3155* (2013.01); *H04N 9/3144* (2013.01)

(58) Field of Classification Search
CPC .. H04N 9/3155; H04N 9/3144; H04N 9/3179; H04N 9/3194; H04N 9/315
See application file for complete search history.

(56) References Cited

U.S. PATENT DOCUMENTS

| | | | |
|---|---|---|---|
| 2005/0068500 A1* | 3/2005 | Tamura | H04N 9/3194 348/E5.119 |
| 2006/0028624 A1 | 2/2006 | Kaise et al. | |
| 2006/0092383 A1* | 5/2006 | Vinson | G03B 21/142 353/69 |
| 2006/0120084 A1 | 6/2006 | Sueoka | |
| 2006/0139236 A1* | 6/2006 | Minatogawa | H04N 9/3129 345/32 |
| 2006/0170871 A1* | 8/2006 | Dietz | G03B 21/2053 353/31 |

(Continued)

FOREIGN PATENT DOCUMENTS

| | | |
|---|---|---|
| JP | H5-8556 A | 1/1993 |
| JP | 2005-031528 A | 2/2005 |

(Continued)

OTHER PUBLICATIONS

Xiaomi Laser TV (Mi Laser Projector 150) https://www.mi.com/global/mi-laser-projector-150/specs/—1 page.

*Primary Examiner* — Michael Lee
(74) *Attorney, Agent, or Firm* — Dority & Manning, P.A.

(57) ABSTRACT

A method of controlling a projector includes detecting whether a human is present or absent between a projection surface and the projector, emitting a first sound when it is detected that the human is present, determining whether or not detecting that the human is present continues during a first period having a first time length, projecting, by the projector, a first projection image including a first image on the projection surface when it is determined that the detecting that the human is present continues, and projecting, by the projector, a second projection image not including the first image on the projection surface when it is determined that the detecting that the human is present does not continue.

11 Claims, 9 Drawing Sheets

(56) References Cited

U.S. PATENT DOCUMENTS

| | | | | |
|---|---|---|---|---|
| 2008/0239250 A1* | 10/2008 | Jose | ................. | H04N 9/3194 |
| | | | | 353/121 |
| 2008/0291405 A1* | 11/2008 | Nagate | ................ | H04N 9/3155 |
| | | | | 353/85 |
| 2009/0051827 A1 | 2/2009 | Yokoyama et al. | | |
| 2010/0177929 A1* | 7/2010 | Kurtz | ................ | H04N 9/3194 |
| | | | | 382/173 |
| 2011/0304833 A1 | 12/2011 | Osaka et al. | | |
| 2012/0092630 A1* | 4/2012 | Furuichi | ........... | G03B 21/2086 |
| | | | | 353/121 |
| 2013/0128240 A1 | 5/2013 | Yoshida et al. | | |
| 2015/0177605 A1* | 6/2015 | Roffet | ................ | H04N 9/3194 |
| | | | | 353/85 |
| 2019/0302594 A1 | 10/2019 | Higashi | | |

FOREIGN PATENT DOCUMENTS

| | | | |
|---|---|---|---|
| JP | 2005-031530 A | | 2/2005 |
| JP | 2006-162653 A | | 6/2006 |
| JP | 2010-226699 A | | 10/2010 |
| JP | 2011-43834 A | | 3/2011 |
| JP | 2013-105171 A | | 5/2013 |
| JP | 2014163954 A | * | 9/2014 |
| JP | 2019-174513 A | | 10/2019 |
| WO | WO2006/129515 A | | 12/2006 |
| WO | WO2006/129515 A | | 12/2008 |
| WO | WO2011/013240 A | | 2/2011 |
| WO | WO2017/038375 A | | 3/2017 |
| WO | WO-2017038375 A1 | * | 3/2017 |

* cited by examiner

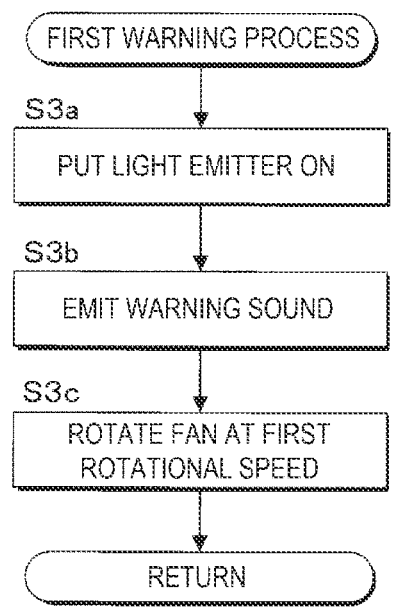

METHOD OF CONTROLLING PROJECTOR AND PROJECTOR

The present application is based on, and claims priority from JP Application. Serial Number 2020-091444, filed May 26, 2020, the disclosure of which is hereby incorporated by reference herein in its entirety.

BACKGROUND

1. Technical Field

The present disclosure relates to a method of controlling a projector, and a projector.

2. Related Art

The projector described in JP-A-2011-43834 (Document 1) has a body sensor. The body sensor detects a presence of a human within a range of light projected from the projector. When the presence of the human has been detected by the body sensor, the projector displays a warning image.

In the technology described in Document 1, since the warning image is displayed every time the human is detected, or immediately after the detection, there is a problem that viewing of a projection image is hindered.

SUMMARY

A method of controlling a projector according to the present disclosure includes detecting whether a human is present or absent between a projection surface and the projector, emitting, from the projector, a first sound when it is detected that the human is present, determining whether or not detecting that the human is present continues during a first period having a first time length from a time point when it is detected that the human is present after it is detected that the human is absent, projecting, by the projector, a first projection image including a first image on the projection surface when it is determined that the detecting that the human is present continues, and projecting a second projection image not including the first image on the projection surface when it is determined that the detecting the human is present does not continue.

A projector according to the present disclosure including a display device, a sensor configured to detect whether a human is present or absent between a projection surface and the projector, a sound output device configured to emit a first sound when it is detected that the human is present, and at least one processor configured to determine whether or not detecting that the human is present continues during a first period having a first time length from a time point when it is detected that the human is present after it is detected that the human is absent, controlling the display device to project a first projection image including a first image on the projection surface when it is determined that the detecting that the human is present continues, and control ng the display device to project a second projection image not including the first image on the projection surface when it is determined that the detecting that the human is present does not continue.

BRIEF DESCRIPTION OF THE DRAWINGS

FIG. 4B is a flowchart showing an operation of the processor in a first warning process.

DESCRIPTION OF AN EXEMPLARY EMBODIMENT

Figure 1:
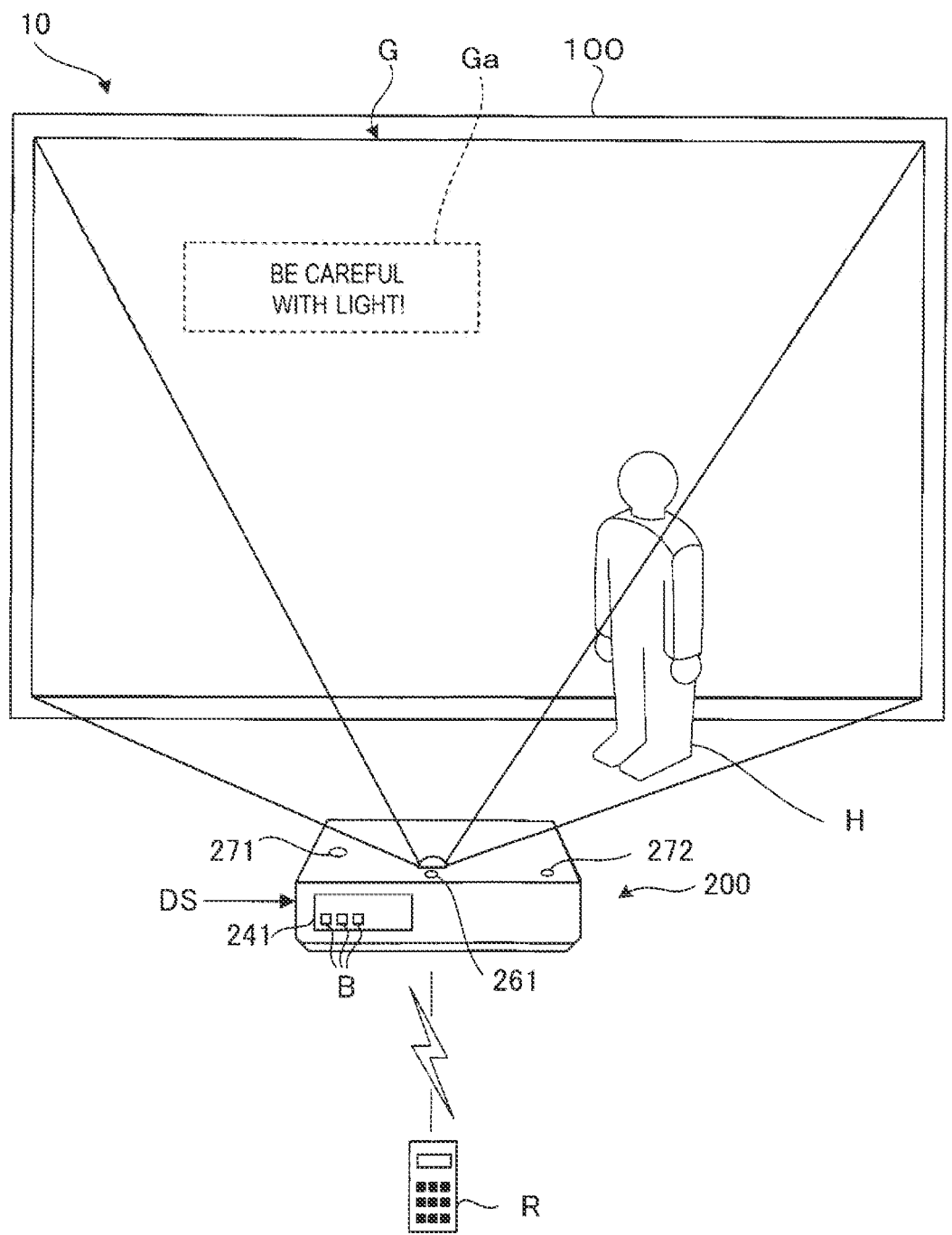
FIG. 1 is a schematic diagram showing a display system according to an embodiment.

A preferred embodiment of the present disclosure will hereinafter be described with reference to the accompanying drawings. It should be noted that in the drawings, the dimension or the scale size of each section is arbitrarily different from the reality, and some portions are schematically shown in order to make understanding easy. Further, the scope or the spirit of the present disclosure is not limited to the embodiment unless there is a particular description or limiting the present disclosure in the following explanation.

1. GENERAL DESCRIPTION OF DISPLAY SYSTEM

FIG. 1 is a schematic diagram showing a display system 10 according to the embodiment. The display system 10 includes a screen 100 and a projector 200.

The projector 200 is coupled to an information processing device not shown so as to be able to communicate with each other with wire or wirelessly. To the projector 200, input image information DS is input from the information processing device.

The projector 200 displays a projection image G based on the input image information DS on the screen 100. The projector 200 in this example is a front type which projects light from the front of the screen 100. In the front type, the projector 200 is located between the viewer and the screen 100. It should be noted that the projector 200 can be a rear type which projects the light from behind the screen 100.

A main body of the projector 200 is controlled by a remote controller R. The remote controller R is a part of the projector 200. Further, the main body of the projector 200 is provided with an operation panel 241, a sound output device 271, a light emitter 272, and a body sensor 261 for detecting a presence of a human. The operation panel 241 is provided with operation buttons B. It is possible for the user to control the projector 200 by holding down the operation buttons B. The operation of the user includes, for example, an operation of setting the power to an ON state or an OFF state, an operation of setting a MUTE state of stopping the display of an image, and an operation of canceling the MUTE state.

When a human exists between the projector 200 and the screen 100, the human blocks the light projected from the projector 200. When an intruder H is located between the projector 200 and the screen 100, the projector 200 notifies the intruder H of the fact that the intruder H blocks the projection image G with a warning sound generated by the sound output device 271 warning light emitted by the light emitter 272, and a warning image Ga displayed on the screen 100. The intruder H is an example of a human existing between the projector 200 and the screen 100. It should be noted that the projection image G includes the warning image Ga in some cases, or does not include the warning image Ga in other cases. In the following description, the projection image G including the warning image Ga is referred to as a first projection image G1, and the projection image G not including the warning image Ga is referred to as a second projection image G2. The warning image Ga is an example of a first image.

2. CONFIGURATION OF PROJECTOR

Figure 2A:
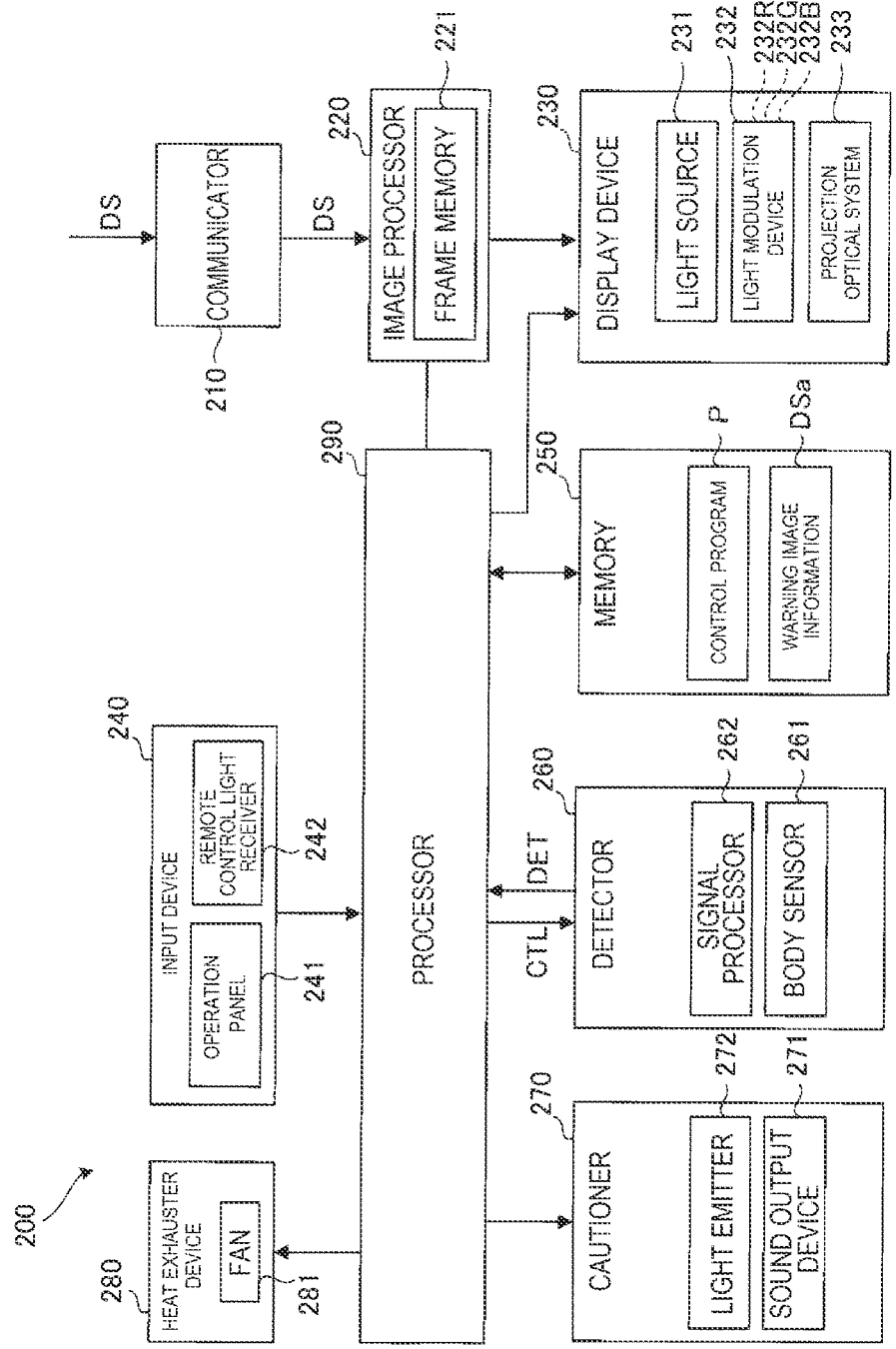
FIG. 2A is a block diagram showing a configuration of a projector.

FIG. 2 is a block diagram showing a configuration of the projector 200 according to the embodiment. As shown in FIG. 2, the projector 200 has a communicator 210, an image processor 220, a display device 230, an input device 240, a memory 250, a detector 260, and a processor 290. These are coupled to each other so as to be able to communicate with each other.

The communicator 210 is an interface coupled to the information processing device so as to be able to communicate with each other. For example, the communicator 210 is an interface for wireless or wired LAN (Local Area Network), USB (Universal Serial Bus), HDMI (High Definition Multimedia interface), or the like. USB and HDMI are each a registered trademark. It should be noted that the communicator 210 can be coupled to the information processing device via another network such as the Internet. The communicator 210 is provided with an interface circuit for electrically processing a signal received via the wireless or wired interface.

The image processor 220 is a circuit for generating an image signal for driving the display device 230 using the input image information DS from the communicator 210. Specifically, the image processor 220 has a frame memory 221, and develops the input image information DS in the frame memory 221 to properly execute a variety of processes such as a resolution conversion process, a resizing process, and a distortion correction process to thereby generate the image signal. The image processor 220 executes, as needed, processing for making the display device 230 display the warning image Ga and so on. In this case, the image processor 220 generates the image signal representing the first projection image G1 based on the input image information DS and warning image information DSa.

The warning image information DSa is stored in the memory 250. The warning image information DSa is input to the image processor 220 via the processor 290. The warning image information DSa represents the warning image Ga. The warning image Ga warns of the fact that there is a possibility that the projection light of the projector 200 damages the human sense of vision. The warning image Ga can be, for example, a text as shown in FIG. 1, or can also be an icon.

The image signal generated by the image processor 220 is input to the display device 230. The image processor 220 is formed of, for example, an integrated circuit. The integrated circuit includes an LSI, an ASIC (Application Specific Integrated Circuit), a PLD (Programmable Logic Device), an FPGA (Field-Programmable Gate Array), an SoC (System-on-a-Chip), and so on. Further, an analog circuit can also be included in a part of the configuration of the integrated circuit.

The display device 230 is a mechanism, for displaying the projection image G based on the image signal from the image processor 220. The display device 230 in the preset embodiment is a projection mechanism for displaying the projection image G on the screen 100. Specifically, the display device 230 has a light source 231, a light modulation device 232, and a projection optical system 233.

The light source 231 includes, for example, a halogen lamp, a xenon lamp, a super-high pressure mercury lamp, an LED (Light Emitting Diode), or a laser source. The light source 231, for example, emits red light, green light, and blue light separately from each other, or emits white light. When the light source 231 emits the white light, the light emitted from the light source 231 is reduced in unevenness of the luminance distribution by an integrator optical system not shown, and is then separated by a color separation optical system not shown into the red light, the green light, and the blue light, and then enters the light modulation device 232.

The light modulation device 232 includes light modulation elements 232R, 232G, and 232B provided so as to correspond respectively to the red light, the green light, and the blue light. The light modulation elements 232R, 232G, and 232B each include, for example, a transmissive liquid crystal panel, a reflective liquid crystal panel, or a digital mirror device. The light modulation elements 232R, 232G, and 232B respectively modulate red light, green light, and blue light based on the image signal from the image processor 220 to generate image light beams of the respective colors. The image light beams of the respective colors generated in the light modulation device 232 are combined by a color combining optical system not shown to thereby turn to full-color image light.

The projection optical system 233 images the full-color image light on the screen 100 to thereby project the full-color image light on the screen 100. The projection optical system 233 is an optical system including at least one projection lens, and can also include a zoom lens, a focus lens, or the like.

The input device 240 is an input device for receiving an operation from the user. The input device 240 has an operation panel 241 and a remote control light receiver 242. The operation panel 241 is provided to an exterior chassis of the projector 200, and is configured to be able to receive an operation from the user. The operation panel 241 outputs a signal based on the operation from the user. The remote control light receiver 242 receives an infrared signal from the remote controller R not shown, and then decodes the infrared signal to output a signal based on the operation of the remote controller.

The memory 250 is a storage device for storing a control program P to be executed by the processor 290, the warning image information DSa, and a variety of types of information to be processed by the processor 290. The memory 250 is constituted by, for example, a hard disk drive or a semiconductor memory. It should be noted that the memory 250 can be provided to a storage device, a server, or the like located outside the projector 200.

The detector 260 detects a presence of a human to output a detection signal PET representing the detection result. The detection signal BET represents whether or not a human exists in a range of the light projected from the projector 200 to the screen 100. The detector 260 operates based on a control signal CTL supplied from the processor 290.

The body sensor 261 detects a presence of the intruder H. The body sensor 261 in this example has sensitivity to a wavelength of infrared light radiated from the intruder H.

For example, the body sensor 261 has a peak in sensitivity at the wavelength of about 10 μm. The body sensor 261 is provided with an optical Lens not shown. A range in which the presence of the intruder H is detected by the detector 260 is decided in accordance with a shape of the optical lens.

Figure 3:
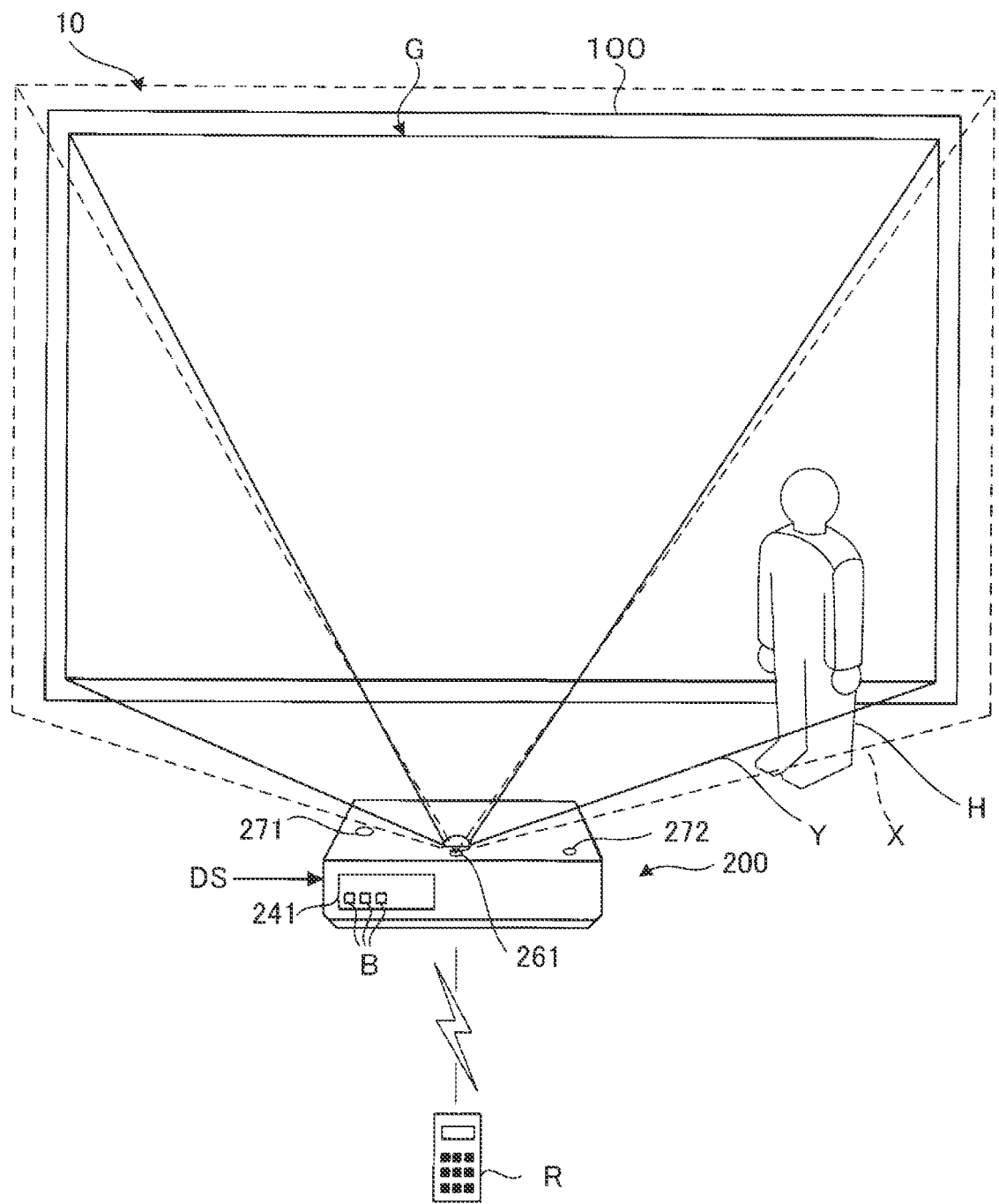
FIG. 3 is an explanatory diagram each showing an example of a range in which a presence of a human is detected by a detector.

FIG. 3 shows an example of the range in which a presence of a human is detected by the detector 260. The range X in which the presence of the intruder H is detected by the detector 260 is a range surrounded by the dotted lines shown in FIG. 3. The range X includes the whole of the range F of the light projected from the projector 200. By setting the range X in such a manner, even when the intruder H partially overlaps the range Y, it is possible to surely detect the presence of the intruder H. It should be noted that the present disclosure is not limited to this configuration, and it is sufficient for the range X to partially or entirely overlap the range Y.

The signal processor 262 performs a filter process on the output signal of the body sensor 261 to thereby generate the detection signal DET. The detection signal DET is supplied to the processor 290. The filter process has a function of, for example, a bandpass filter. The signal processor 262 removes a noise included in the output signal of the body sensor 261.

A cautioner 270 has a function of warning a human. The cautioner 270 includes the sound output device 271 and the light emitter 272. The sound output device 271 generates the warning sound. The sound output device 271 is formed of, for example, a speaker or a buzzer. The light emitter 272 emits the warning light. To the light emitter 272, there corresponds for example, an LED (Light Emitting Diode). The cautioner 270 is controlled by a control signal output from the processor 290.

A heat exhauster device 280 has a function of releasing the internal heat of the projector 200 to the outside. The heat exhauster device 280 of this example is provided with a fan 281. The heat exhauster device 280 is controlled by a control signal output from the processor 290. The control signal designates, for example, a rotational speed of the fan 281.

The processor 290 is a processing device having a function of controlling each constituent of the projector 200 and a function of processing a variety of types of data. The processor 290 includes, for example, a CPU (Central Processing Unit). The processor 290 executes the control program P stored in the memory 250 to control each constituent of the projector 200. It should be noted that the processor 290 can be formed of a single processor, or can also be formed of a plurality of processors. Further, some or all of the functions of the processor 290 can also be realized by hardware such as a DSP (Digital Signal Processor), an ASIC (Application Specific Integrated Circuit), a PLD (Programmable Logic Device), or an FPGA (Field Programmable Gate Array).

Figure 2B:
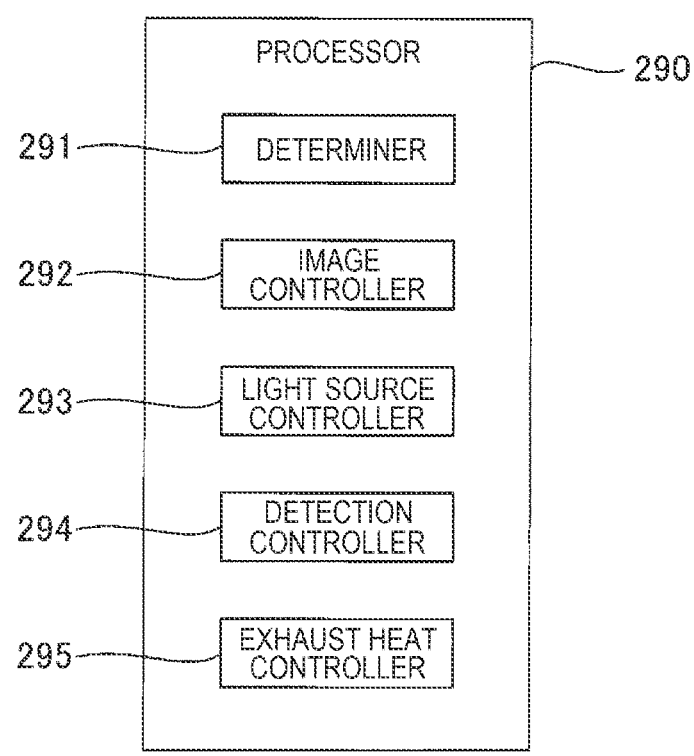
FIG. 2B is a block diagram showing functions of a processor.

FIG. 2B is a block diagram showing the functions of the processor 290. The processor 290 executes the control program P to thereby function as a determiner 291, an image controller 292, a light source controller 293, a detection controller 294, and an exhaust heat controller 295.

The determiner 291 determines whether or not a state in which the result of the detection is "presence" continues in a first period from a time point when the result of the detection represented by the detection signal DET changes from "absence" to "presence" to when a first time length elapses from the time point. In other words, there is determined whether or not the intruder H continuous exists between the projector 200 and the screen 100 for the first time length.

The image controller 292 projects the first projection image G1 including the warning image Ga on the screen 100 as the projection image G when the determination result of the determiner 291 is affirmative, or projects the second projection image G2 not including the warning image Ga on the screen 100 as the projection image G when the determination result of the determiner 291 is negative.

The light source controller 293 controls lighting and extinction of the source 231. Further, when the light source 231 is lighted, the light source controller 293 controls the light intensity of the light source 231.

The detection controller 294 controls an operation of the detector 260. The exhaust heat controller 295 controls an operation of the heat exhauster device 280. More specifically, the exhaust heat controller 295 controls the rotational speed of the fan 281.

3. OPERATION OF PROJECTOR

The operation of the projector 200 will hereinafter be described separating the operation into a warning control process and a MUTE process.

3-1. Warning Control Process

Figure 4A:
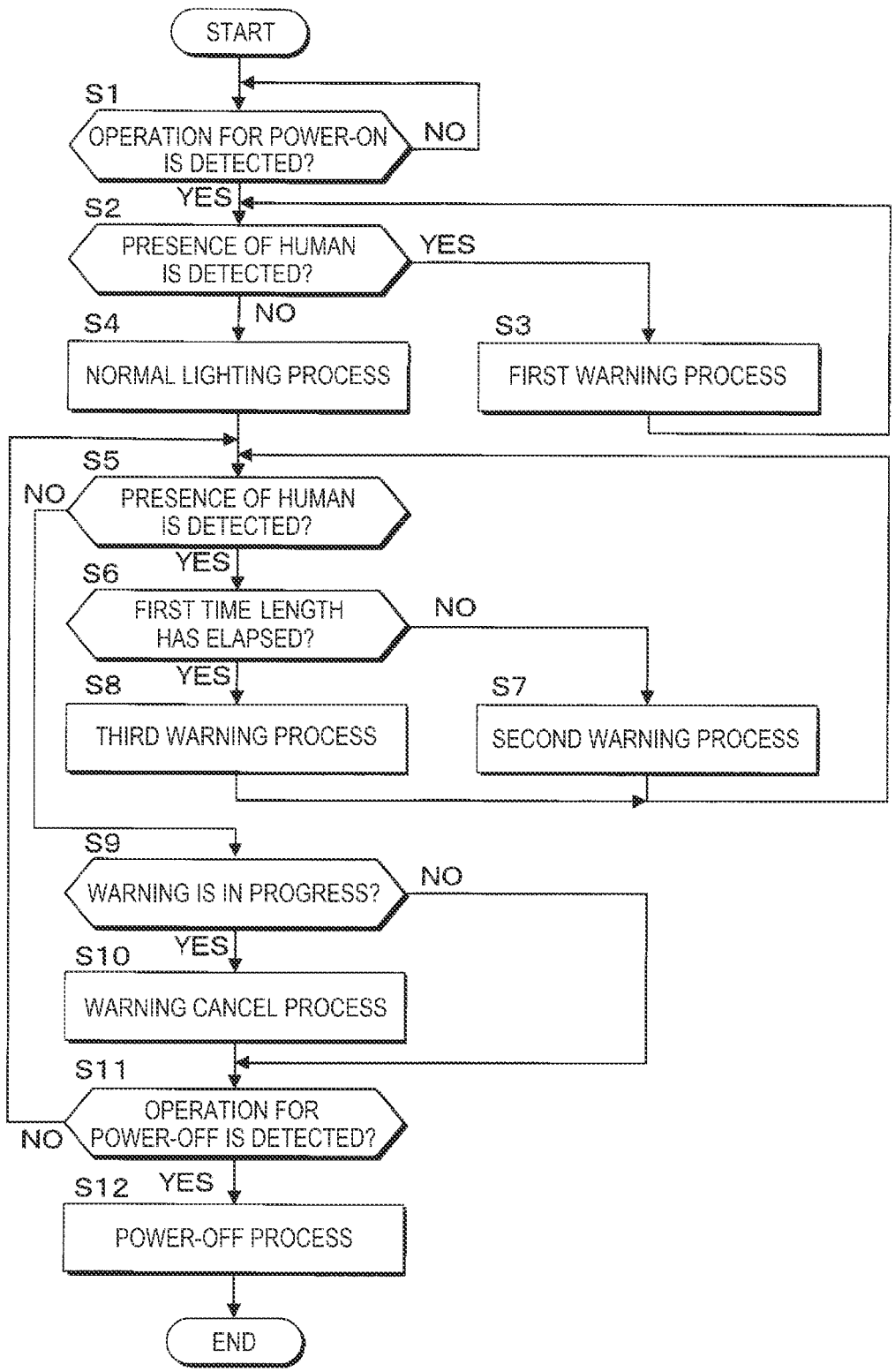
FIG. 4A is a flowchart showing an operation of the processor related to a warning control process of the projector.

FIG. 4A is a flowchart showing an operation related to the warning control process of the projector 200. The processor 290 determines (S1) whether or not an operation of setting the power to an ON state has been detected based on an operation signal input from the input device 240. When the determination result in the step S1 is negative, the processor 290 repeats the determination in the step S1 until the determination result in the step S1 becomes affirmative.

When the determination result in the step S1 is affirmative, the processor 290 determines (S2) whether or not the intruder H exists between the projector 200 and the screen 100 based on the detection signal DET output from the detector 260. It should be noted that in the step S2, the light source 231 has not yet been lighted. When the detection signal DET represents "presence" of the intruder H, the determination result in the step S2 becomes affirmative.

When the determination result in the step S2 is affirmative, the processor 290 performs (S3) a first warning process. FIG. 4B is a flowchart showing an operation of the processor 290 in the first warning process.

Although the operation of setting the power to the ON state was detected in the step S1, the processor 290 does not put the light source 231 on as shown in FIG. 4B. By the power being set to the ON state, the detector 260 starts to operate. When the detection signal PET has represented "presence" of the intruder H since the detector 260 started to operate, the processor 290 does not put the light source 231 on.

Instead of putting the light source 231 on in response to the operation of setting the power to the ON state in the step S1, the processor 290 puts (S3a) the light emitter 272 on. Thus, the light emitter 272 emits the warning light. Then, the processor 290 makes the sound output device 271 emit (S3b) the warning sound.

Then, the processor 290 controls (S3c) the heat exhauster device 280 to rotate the fan 281 at a first rotational speed R1. The first rotational speed R1 is a rotational speed necessary to keep the internal temperature of the projector 200 appropriate by exhausting the internal heat of the projector 200 to the outside in the state in which the light source 231 is put off.

It should be noted that although there is described in FIG. 4B when the processor 290 performs the process in the order of the step S3a, the step S3_b, and the step S3c, these steps can be executed in a different order, or can be started to be executed at the same time.

It should be noted that the processor 290 does not make the warning image Ga be displayed on the screen 100 in the first warning process. Further, in the first warning process, is possible for the processor 290 to perform the warning of only either one of the light emitter 272 and the sound output device 271. When the first warning process has ended, the processor 290 returns the process to the step S2 shown in FIG. 4A.

In contrast, when the determination result in the step S2 is negative, the processor 290 performs (S4) a normal lighting process. In the normal lighting process, the processor 290 puts the light source 231 on. In this case, the processor 290 makes the source 231 emit light with normal light intensity. The normal light intensity is the light intensity for displaying an input image designated by the input image information DS.

Further, in the normal light process, the processor 290 rotates the fan 281 at a reference speed Rr. The reference rotational speed Rr is a rotational speed necessary to keep the internal temperature of the projector 200 appropriate when making the light source 231 emit light with the normal light intensity.

When the determination result in the step S2 has changed from affirmative to negative at a certain time point, the light source 231 is put on. In other words, when the detection signal DET des represented "presence" of the intruder H since the beginning of the detection operation by the detector 260, a subsequent change of the detection signal DET from "presence" of the intruder H "absence" thereof triggers the processor 290 to put the light source 231 on.

After putting the light source 231 on in the step S4, the processor 290 determines (S5) whether or not the intruder H exists between the projector 200 and the screen 100 based on the detection signal DET. When the detection signal DET represents "presence" of the intruder H, the determination result in the step S5 becomes affirmative.

When the determination result in the step 35 is affirmative, the processor 290 determines (S6) whether or not the state in which the detection signal DET represents "presence" of the intruder H continues in the first period from the time point when the detection signal DET changes from "absence" of the intruder H to "presence" of the intruder H to when the first time length elapses from the time point.

Figure 4C:
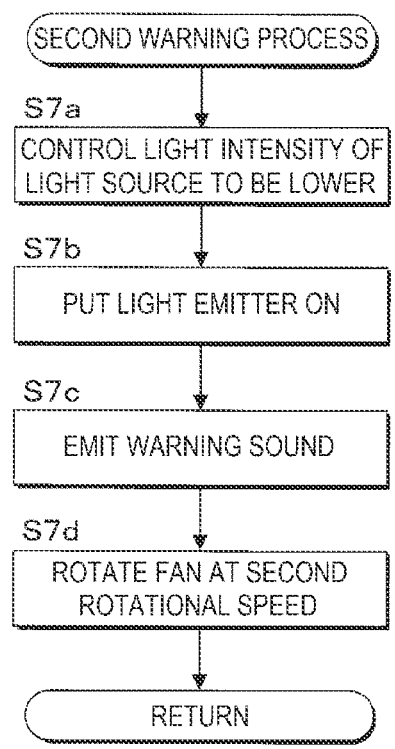
FIG. 4C is a flowchart showing an operation of the processor in a second warning process.

When the determination result in the step S6 is negative, the processor 290 performs (S7) a second warning process. FIG. 4C is a flowchart showing an operation of the processor 290 in the second warning process.

As shown in FIG. 4C, the processor 290 makes (S7a) the light intensity of the light source 231 lower than the normal light intensity. For example, the processor 290 controls the light source 231 to have the light intensity 50% of the normal light intensity.

Then, the processor 290 puts (S7b) the light emitter 272 on. Thus, the light emitter 272 emits the warning light. Then, the processor 290 makes the sound output device 271 emit (S7c) the warning sound.

Then, the processor 290 controls (S7d) the heat exhauster device 280 to rotate the fan 281 at a second rotational speed R2. The second rotational speed R2 is a rotational speed necessary to keep the internal temperature of the projector 200 appropriate b exhausting the internal heat of the projector 200 to the outside in accordance with the light intensity of the light source 231.

It should be noted that the processor 290 does not make the warning image Ga be displayed on the screen 100 in the second warning process. Further, in the second warning process, it is possible for the processor 290 to perform the warning of only either one of the light emitter 272 and the sound output device 271. Further, although there is described in FIG. 4C when the processor 290 performs the process in the order of the step S7a, the step S7b, the step S7c, and the step S7d, these steps can be executed in a different order, or can be started to be executed at the same time. Further, it is possible to perform the second warning process in the step S7 after continuing to detect the presence of a human for a predetermined time length in the step S5. On this occasion, when the detection of the presence of the human stops before the predetermined time length elapses from the time point when the presence of the human is detected in the step S5, the process makes the transition from the step S5 to the step S9 instead of making the transition from the step S5 to the step S6. It should be noted that the predetermined time length in this case is, for example, one second.

The description will be returned to FIG. 4A. When the determination result in the step S6 is affirmative, the processor 290 performs (S8) a third warning process. FIG. 4C is a flowchart showing an operation of the processor 290 in the third warning process.

Figure 4D:
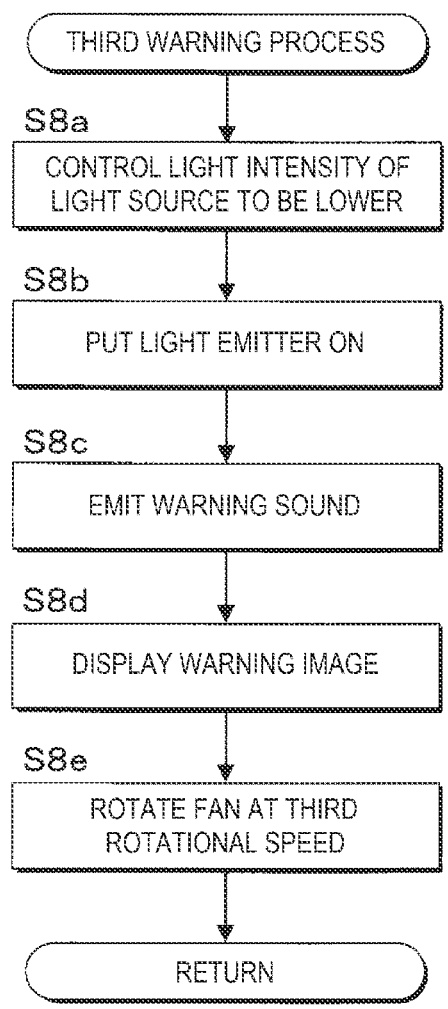
FIG. 4D is a flowchart showing an operation of the processor in a third warning process.

As shown in FIG. 4D, the processor 290 makes (S8a) the light intensity of the light source 231 lower than the normal light intensity. For example, the processor 290 controls the light source 231 to have the light intensity 50% of the normal light intensity.

Then, the processor 290 puts (S8b) the light emitter 272 on. Thus, the light emitter 272 emits the warning light. Then, the processor 290 makes the sound output device 271 emit (S8c) the warning sound.

Then, the processor 290 makes (S8d) the first projection image G1 including the warning image Ga be projected on the screen 100.

Then, the processor 290 controls (S8e) the heat exhauster device 280 to rotate the fan 281 at a third rotational speed R3. The third rotational speed R3 is a rotational speed necessary to keep the internal temperature of the projector 200 appropriate by exhausting the internal heat of the projector 200 to the outside in accordance with the light intensity of light source 231. It should be noted that in the third warning process, it possible for the processor 290 to perform the warning of only either one of the light emitter 272 and the sound output device 271. Further, although there is described in FIG. 4D when the processor 290 performs the process in the order of the step S8a, the step S8b, the step S8c, the step S8d, and the step S8e, these steps can be executed a different order, or can be started to be executed at the same time.

Here, the second rotational speed R2 is lower than the reference rotational speed Rr, and the third rotational speed R3 is lower than the reference rotational speed Rr. Therefore, an amount of the exhaust heat as an internal heat of the projector 200 to be exhausted to the outside is smaller during the period in which the light intensity of the light source 231 is reduced to 50% compared to the period in which the light intensity of the light source 231 is the normal light intensity. This is because during the second warning process or the third warning process, the light intensity of the light source 231 is reduced to 50% of the light intensity in the normal state. The second rotational speed R2 and the third rotational speed R3 are set so as to optimize so-called cooling control. Thus, it is possible to prevent supercooling of the light source 231. As a result, it is possible for the projector 200 to extend the life of the light source 231, and at the same time, to reduce the power consumption.

The description will be returned to FIG. 4A. When the determination result in the step S5 is negative, the processor 290 determines (S9) whether or not the warning is in progress. In other words, the processor 290 determines whether or not the second warning process or the third warning process is in execution. It should be noted that it is possible to make the transition to the step S9 when the negative determination result is obtained in the step S5, or it is also possible to make the transition to the step S9 when the negative determination result continues for a predetermined time length from the time point when getting the negative determination result, and to make the transition to the step S6 when getting the affirmative determination result during the predetermined time length. It should be noted that the predetermined time length in this case is, for example, one second.

When the determination result in the step S9 is affirmative, the processor 290 performs (S10) a warning cancel process. In the warning cancel process, the processor 290 first restores the light intensity of the light source 231 to the normal light intensity. Second, the processor 290 stops the warning sound emitted by the sound output device 271. Third, the processor 290 stops the light emission by the light emitter 272. Further, when the first projection image G1 including the warning image Ga is projected on the screen 100 due to the third warning process, the processor 290 makes the second projection image G2 not including the warning image Ga be projected on the screen 100 as the projection image G. In addition, the processor 290 performs the control so that the rotational speed of the fan 281 becomes the reference rotational speed Rr.

When the determination result in the step S9 is negative, or when the warning cancel process in the step S11 is completed, the normal operation state is set. Subsequently the processor 290 determines (S11) whether or not an operation of setting the power to the OFF state has been detected. When the determination result in the step S11 is negative, the processor 290 returns the process to the step S5. In contrast when the determination result in the step S11 is affirmative, the processor 290 controls (S12) the power to the OFF state.

As described hereinabove, when it has been detected that the intruder H exists between the projector 200 and the screen 100 after the processor 290 controls the power to the ON state, and before the light source 231 is put on, the processor 290 performs the first warning process without putting the light source 231 on. In the first warning process, the warning sound is emitted from the sound output device 271, and the light emitter 272 is put on. Since unnecessary lighting of the light source 231 is not performed, it is possible to reduce the heat generation, and at the same time, it is possible to extend the life of the light source 231.

Further when the first warning process continues for the first time length, the processor 290 makes the transition of the process from the first warning process to the second warning process. Specifically, the warning by the first warning process functions as an advance warning, and the warning by the second warning process functions as a main warning. Therefore, it is possible for the projector 200 to perform a phased warning. Further, since the warning image Ga is not displayed in the warning by the first warning process, it is unachievable for the projector 200 to prevent the image display when someone enters the detection area by mistake or the like compared to when displaying the warning image Ga. Further, since the warning image Ga is displayed in the second warning process, it is possible to provide a strong visual warning to the human existing between the projector 200 and the screen 100. In addition, the condition for making the transition from the first warning process to the second warning process is that the first time length elapses. Therefore, it becomes possible for the projector 200 to perform the phased warning without adding a new sensor.

3-2. MUTE Process

Figure 5:
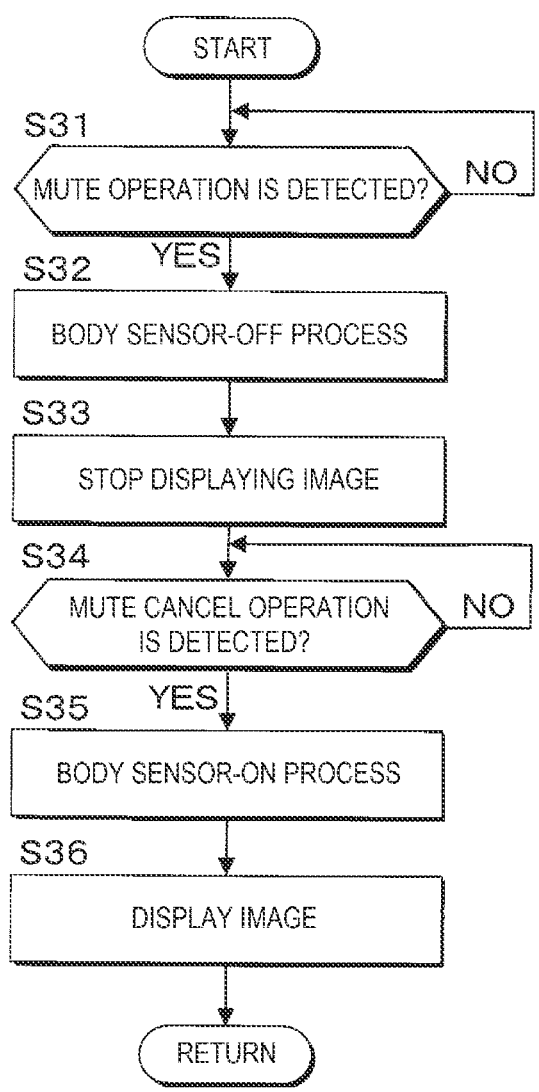
FIG. 5 is a flowchart showing an operation of the processor related to a MUTE process.

FIG. 5 is a flowchart showing an operation related to the MUTE process of the projector 200.

First, the processor 290 determines (S31) whether or not an operation of setting the MUTE state of stopping the display of an image has been detected based on the operation signal input from the input device 240. When the determination result in the step S31 is negative, the processor 290 repeats the determination in the step S31 until the determination result in the step S31 becomes affirmative.

When the determination result in the step S31 is affirmative, the processor 290 controls (S32) the body sensor 261 to the OFF state. Subsequently, the processor 290 stops (S33) the display of the image. Specifically, the processor 290 outputs a control signal of performing black display in the entire screen to the image processor 220. Alternatively, the processor 290 outputs a control signal of putting the light source 231 off to the light source 231.

Then, the processor 290 determines (S34) whether or not an operation of canceling the MUTE state has been detected based on the operation signal. When the determination result in the step S34 is negative, the processor 290 repeats the determination in the step S34 until the determination result in the step S34 becomes affirmative.

When the determination result in the step S34 is affirmative, the processor 290 controls (S35) the body sensor 261 to the ON state. Subsequently, the processor 290 makes (S36) the image be displayed. Specifically, the processor 290 outputs a control signal of instructing to generate the image signal based on the input image information DS to the image processor 220. Alternatively, the processor 290 outputs a control signal of putting the light source 231 on to the light source 231.

In the MUTE state in which the projection image G is not displayed, the projection light is not projected, and therefore, there is no need to issue the warning even when the intruder H supposedly exists between the projector 200 and the screen 100. According to the MUTE process, when the projection image G is not projected to the screen 100, the detection operation by the body sensor 261 stops. Therefore, it is possible to prevent the warning from being issued to the intruder H using the warning sound or the warning light during the MUTE process.

As described hereinabove, according to the present embodiment, the projector 200 is provided with the light source 231 for generating the light for projecting the projection image G to the screen 100 as an example of the projection surface. The method of controlling the projector 200 detects presence or absence of the intruder H as an example of a human existing between the screen 100 and the projector 200. The detection is played by the detector 260. When the result of the detection is "presence" of a human, the warning sound as an example of a first sound is emitted from the projector 200. The emission of the warning sound is played by the cautioner 270. Further, there is determined whether or not a state in which the result of the detection is "presence" continues in the first period from the time point when the result of the detection represented by the detection signal DET changes from "absence" to "presence" to when the first time length elapses from the time point. The determination is played by the determiner 291. When the result of the determination is affirmative, the first projection image including the warning image Ga as an example of the first image is projected on the screen 100 as the projection image G. In contrast, when the result of the determination is negative, the second projection image G2 not including the warning image Ga is projected on the screen 100 as the projection image G. The control is played by the image controller 292.

According to this control method, first, there is performed the warning with the warning sound. Then, when the state in which a human exists between the screen 100 and the projector 200 continues for the first time length, the warning using the warning image Ga is performed. Therefore, when the human becomes aware of the warning and clears away in the first period, the warning with the warning image Ga is not issued. Therefore, a normal image is provided. Therefore, according to the projector 200, viewing of the projection image G becomes possible while warning to the human.

Further, when the result of the detection regarding the presence or absence of a human existing between the screen 100 and the projector 200 has been "presence" since the beginning of the detection operation, the projector 200 does not put the light source 231 on. Therefore, since the light source 231 is unnecessarily put on, it is possible to reduce the power consumption of the projector 200.

Further, when the result of the detection has been "presence" since the beginning of the detection operation, a change of the detection result from "presence" to "absence" triggers the projector 200 to put the light source 231 on. Therefore, after the human existing between the screen 100 and the projector 200 clears away, it is possible to display the normal image.

Further, the projector 200 is provided with the fan 281 as an example of the heat exhauster device for exhausting the internal heat of the projector 200 to the outside, and controls the light source 231 to thereby make the light intensity of the light source 231 when projecting the first projection image G1 including the warning image Ga as an example of the first image on the screen 100 lower than the light intensity of the light source 231 when projecting the second projection image G2 not including the warning image Ga on the screen 100. Further, the projector 200 controls the fan 281 to thereby make the amount of exhaust heat when projecting the first projection image G1 on the screen 100 smaller than the amount of exhaust heat when projecting the second projection image G2 on the screen 100.

Since the fan 281 controlled in such a manner, it is possible to prevent the supercooling of the light source 231. As a result, it is possible for the projector 200 to extend the life of the light source 231, and at the same time, to reduce the power consumption.

Further, the projector 200 stops the detection of the presence or absence of a human existing between the screen 100 and the projector 200 in the period from when receiving the instruction not to project the projection image G on the screen 100 to when that instruction is canceled. There is no inconvenience even when stopping the detection of the presence or absence of a human in the period of keeping the so-called MUTE state, and it is possible to reduce the power due to the operation of the detection. Further, it is prevented to issue a false warning due to a false determination result.

4. MODIFIED EXAMPLES

Each of the configurations illustrated hereinabove can variously be modified. Some specific configurations of the modifications which can be applied to each of the configurations described above will be illustrated below. Two or more aspects arbitrarily selected from the following illustrations can properly be combined with each other unless conflicting with each other.

4-1. Modified Example 1

In the configuration described above, the detector 260 is provided with the body sensor 261, and detects a human by operating the body sensor 261, but the present disclosure is not limited thereto. Any configurations can be adopted as the detector 260 providing the detector 260 can detect a human. For example, it is possible for the detector 260 to be provided with an imaging device for taking an image of the screen 100 to thereby detect a human based on the taken image information taken by the imaging device. Further, it is possible for the detector 260 to detect a human using an ultrasonic wave, or to be provided with a ToF (Time of Flight) sensor, project detecting light, then figure out a position of an object based on the time for detecting reflected light of the detecting light, and then detect a human based on a change in the position of the object.

Further, it is possible for the processor 290 to identify a position of a human existing between the screen 100 and the projector 200 based on the taken image information, and then dispose the warning image Ga at a position not overlapping the human based on the position of the human thus identified. In this case, the 290 supplies the image processor 220 with a control signal for designating the position of the warning image Ga. The image processor 220 generates an image signal representing the first projection image G1 having the warning image Ga disposed at the position designated by the control signal, and then supplies the display device 230 with the image signal thus generated.

By controlling the position of the warning image Ga so as not to overlap the human in such a manner, it is possible to perform an effective warning to the human.

4-2. Modified Example 2

Although the first time length is fixed in the configuration described above, the present disclosure is not limited thereto. For example, it is possible for the first time length to be set in accordance with an operation by the user to the projector 200. For example, it is possible for the first time length to be set using the remote controller R, or to be set in accordance with an operation by the user to the operation panel 241. Since the user sets the first time length in such a manner, it is possible for the user to decide the warning depending on the intended use of the projector 200. Therefore, the convenience of the projector 200 is enhanced.

4-3. Modified Example 3

In the configuration described above, the sound output device 271 emits the warning sound during the first warning process, the second warning process, and the third warning process. It is possible for the processor 290 to control the warning sound based on the duration of the state in which the detection result represented by the detection signal DET is "presence." For example, it is possible for the processor 290 to set the volume of the warning sound so that the longer the duration of the state in which the detection result is "presence" of a human is, the higher the volume of the warning sound is. Alternatively, it is possible for the processor 290 to change a type of the warning sound when the duration of the state in which the detection result is "presence" of a human exceeds the processing time.

Further, it is possible for the processor 290 to control the warning sound based on the state of the projector 200. For example, when the state of the projector 200 is the MUTE state, it is possible for the processor 290 to make the volume of the warning sound lower compared to when the state of the projector 200 is not the MUTE state. Thus, it is possible for the projector 200 to notify the operator of the fact that a human exists between the projector 200 and the screen 100 in the MUTE state.

4-4. Modified Example 4

In the configuration described above, when the detection result represented by the detection signal DET changes from "presence" of a human to "absence" of a human, the processor 290 performs the warning cancel process, and thus, the light source 231 emits the light with the normal light intensity. However, in the present disclosure, when a change from "presence" of a human to "absence" of a human occurs, it is possible for the processor 290 to make the light intensity of the light source 231 in the second period from the time point when the change from "presence" of a human to "absence" of a human occurs to when the second time length elapses from that time point lower than the normal light intensity.

For example, the light intensity in the second period can be 50 of the normal light intensity, or can also be 75% of the normal light intensity. When adopting 50% of the normal light intensity, the light intensity of the light source 231 is kept in that light intensity for just the second time length in the second warning process and the third warning process, and then, the transition of the light intensity of the light source 231 to the normal light intensity is made.

Since light intensity of the light source 231 is not immediately restored to the normal light intensity, but the light source 231 is set in the dimmed state in the warning cancel process as described above, it is possible to prevent a significant change in screen.

4-5. Modified Example 5

In the configuration described above, the projector 200 is provided with the operation panel provided with the operation buttons B. When the user operates the operation buttons B, since the user approaches the projector 200, there is a possibility that the second warning process and the third warning process are performed. Therefore, when the processor 290 has detected the fact that the operation button B has been operated, it is possible for the processor 290 to stop the detection of the presence or absence of a human existing between the screen 100 and the projector 200. Specifically, the processor 290 outputs a control signal of instructing to stop the detection operation to the detector 260.

Further, it is possible for the processor 290 to stop the detection of the presence or absence of a human existing between the screen 100 and the projector 200 in a third period from the time point when the operation of the operation button B is detected or the time point when the detection of the presence or absence of a human is stopped to when a third time length elapses from that time point. In this case, when the third period ends, the processor 290 resumes the detection of the presence or absence of the human.

By performing the control described hereinabove, an unintended warning can be prevented. Therefore, the convenience of the projector 200 is enhanced.

What is claimed is:

1. A method of controlling a projector comprising:
    detecting whether a human is present or absent between a projection surface and the projector;
    emitting, by the projector, a first sound when it is detected that the human is present;
    determining whether or not detecting that the human is present continues during a first period having a first time length from a time point when it is detected that the human is present after it is detected that the human is absent;
    projecting, by the projector, a first projection image including a first image on the projection surface when it is determined that the detecting that the human is present continues; and
    projecting, by the projector, a second projection image not including the first image on the projection surface when it is determined that the detecting that the human is present does not continue,
    wherein
    the projector includes
        a light source, and
        a heat exhauster device configured to exhaust an internal heat of the projector to an outside, and wherein
    controlling a light intensity of the light source when projecting the first projection image to be lower than a light intensity of the light source when projecting the second projection image, and
    controlling the heat exhauster device to make an amount of exhaust heat when projecting the first projection image smaller than an amount of the exhaust heat when projecting the second projection image.

2. The method of controlling the projector according to claim 1, wherein
    the first image is disposed at a position which does not overlap the human.

3. The method of controlling the projector according to claim 1, wherein
    the first time length is set in accordance with an operation by a user to the projector.

4. The method of controlling the projector according to claim 1, wherein
    controlling the first sound based on at least one of a state whether or not the projector is projecting an image and a duration of the detecting that the human is present continues.

5. The method of controlling the projector according to claim 1, wherein
    the projector includes a light source, and
    when the detecting is started during the light source is put off, the light source is not put on when the it is detected that the human is present.

6. The method of controlling the projector according to claim 5, wherein
    putting the light source on when it is detected that the human is absent after it is detected that the human is present.

7. The method of controlling the projector according to claim 1, wherein
    the projector includes a light source, and
    when it is detected that the human is absent after it is detected that the human is present, controlling a light intensity of the light source during a second period having second time length from a time point when it is detected that the human is absent after it is detected that the human is present to be lower than a normal light intensity of the light source.

8. The method of controlling the projector according to claim 1, wherein
when an instruction of projecting no projection image on the projection surface is received, the detecting is stopped until the instruction is canceled.

9. The method of controlling the projector according to claim 1, wherein
the projector includes an operation button configured to be operated by a user, and
when it is detected that the operation button was operated, the detecting is stopped.

10. A projector comprising:
a display device;
a sensor configured to detect whether a human is present or absent between a projection surface and the projector;
a sound output device configured to emit a first sound when it is detected that the human is present;
a light source;
a heat exhauster device configured to exhaust an internal heat of the projector to an outside; and
at least one processor configured to
determine whether or not detecting that the human is present continues during a first period having a first time length from a time point when it is detected that the human is present after it is detected that the human is absent,
control the display device to project a first projection image including a first image on the projection surface when it is determined that the detecting that the human is present continues, and
control the display device to project a second projection image not including the first image on the projection surface when it is determined that the detecting that the human is present does not continue,
wherein
controlling a light intensity of the light source when projecting, the first projection image to be lower than a light intensity of the light source when projecting the second projection image, and
controlling the heat exhauster device to make an amount of exhaust heat when projecting the first projection image smaller than an amount of the exhaust heat when projecting the second projection image.

11. A method of controlling a projector which includes a light source configured to emit light and a fan configured to radiate internal heat of the projector to the outside and which project a projection image based on the light, the method comprising:
emitting the light from the light source;
rotating the fan at a first speed;
determining whether or not projected light from the projector is blocked by a human;
when the projected light is blocked by the human and when a first time length from a time point that the projected light is blocked by the human does not elapse, reducing light intensity of the light source, rotating the fan at a second speed smaller than the first speed, and emitting a first sound from the projector, and
when the projected light is blocked by the human and when the first time length elapsed, projecting the projection image including a first image which notifies the human of blocking the projected light, in addition to reduction of the light intensity, reduction of rotating speed of the fan, and emission of the first sound.

* * * * *